(12) United States Patent
Carlson

(10) Patent No.: US 6,238,092 B1
(45) Date of Patent: May 29, 2001

(54) AIR BEARING FOR A MOTION SYSTEM

(75) Inventor: Ronald S. Carlson, St. Cloud, MN (US)

(73) Assignee: Tru-Stone Corporation, Waite Park, MN (US)

( * ) Notice: Subject to any disclaimer, the term of this patent is extended or adjusted under 35 U.S.C. 154(b) by 0 days.

(21) Appl. No.: 09/323,421

(22) Filed: Jun. 1, 1999

(51) Int. Cl.⁷ ................................................. F16C 32/06
(52) U.S. Cl. ........................................................ 384/12
(58) Field of Search ..................................... 384/12, 100

(56) References Cited

U.S. PATENT DOCUMENTS

| | | | |
|---|---|---|---|
| 3,582,211 | 6/1971 | McClure et al. | 356/110 |
| 3,671,049 | * 6/1972 | Stamm | 384/100 X |
| 3,980,003 | * 9/1976 | Huebner et al. | 384/100 X |
| 3,984,039 | 10/1976 | Hawley et al. | 226/97 |
| 4,155,173 | 5/1979 | Sprandel | 33/174 L |
| 4,234,175 | 11/1980 | Sato et al. | 269/73 |
| 4,368,930 | * 1/1983 | Duchaine | 384/12 |
| 4,521,121 | * 6/1985 | Klein et al. | 384/100 |
| 4,571,799 | 2/1986 | Chitayat | 29/149.5 A |
| 4,594,791 | * 6/1986 | Brandstetter | 33/503 |
| 4,610,089 | 9/1986 | Bell et al. | 33/1 M |
| 4,727,653 | 3/1988 | Fujitani et al. | 33/503 |
| 4,802,774 | 2/1989 | Pesikov | 384/12 |
| 4,817,930 | 4/1989 | Van Deuren | 269/73 |
| 4,869,626 | * 9/1989 | Kosmowski | 384/12 X |
| 4,882,847 | 11/1989 | Hemmelgarn et al. | 33/503 |
| 5,238,308 | * 8/1993 | Lang et al. | 384/100 X |
| 5,488,771 | 2/1996 | Devitt et al. | 29/898.02 |
| 5,562,395 | * 10/1996 | Yamazaki et al. | 384/12 X |
| 5,692,838 | * 12/1997 | Yoshimoto et al. | 384/12 |

FOREIGN PATENT DOCUMENTS

| | | | |
|---|---|---|---|
| 10288225 | 10/1998 | (JP) | F16C/32/00 |

OTHER PUBLICATIONS

"Starrett on Coordinate Measuring: Bearing Systems", http://www.starrett.com/starrettoncm/bearing.html, 2 pages.

* cited by examiner

Primary Examiner—Rodney H. Bonck
(74) Attorney, Agent, or Firm—Schwegman, Lundberg, Woessner & Kluth, P.A.

(57) ABSTRACT

An improved air bearing for a precision motion system is herein disclosed. The bearing comprises an insert that is secured within a passageway of a bearing member. The passageway is fluidly coupled to a pressurized fluid source such as air. When the fluid source is activated, pressurized fluid is delivered to the passageway. An orifice in the insert permits the fluid to escape from the passageway and form an air film between the bearing member and an opposed guiding surface. The orifice is placed immediately adjacent to the bearing surface so that the air volume forming the air film is minimal. The improved air bearing eliminates the conventional bearing pad used with other motion systems. Accordingly, the major system components are made from one material such as granite. A unitary material permits the system to remain dimensionally stable even when subjected to wide variations in temperature.

18 Claims, 7 Drawing Sheets

AIR BEARING FOR A MOTION SYSTEM

TECHNICAL FIELD

This invention relates generally to air bearings and, more particularly, to an air bearing used to support a massive moving table in a high precision motion system.

BACKGROUND

The instant invention is intended for use with precision motion systems such as coordinate measuring machines ("CMM"), large machine tools, semiconductor manufacturing equipment (e.g., mask alignment) and the like. Generally, these systems utilize a movable table having a precision ground and lapped working surface which slidably engages one or more stationary guideway surfaces for horizontal movement. While permitting longitudinal motion, vertical and lateral displacement of the table are substantially restricted. In many applications, these systems use servo-controlled drive systems or the like to permit precise linear positioning of the table.

To ensure accurate table movement, a bearing system is provided. In smaller systems, conventional linear bearing assemblies (e.g., roller bearings) provide adequate support without introducing excessive rolling resistance (friction). However, with larger motion systems having massive tables, conventional mechanical bearings are insufficient due to their large size and significant rolling resistance. To overcome these problems, air bearings are frequently used.

In the context of a motion system, an air bearing is generally a series of bearing "pads" which sit between the table and the guideways. Each pad has a backside which operatively couples to a slide portion of the table by fastening, vacuum coupling, adhesive or other acceptable means. The pad further has a face side which forms the bearing surface. The face side includes one or more openings or "pockets" oriented normal to the guideway surface. The pocket is generally coupled to a pressurized air source such that, when the air source is activated, pressurized air is delivered thereto. To create a relatively stiff bearing, it is advantageous to restrict the air flow through the pocket. This is typically accomplished with a restricting orifice located within the bearing pad. Once the pocket becomes pressurized, air escaping from the pocket to atmosphere creates an air film between the bearing face and the guideway surface. This air film permits the table to "float" and move relatively friction-free along the guideways.

While one group of bearings "lifts" the table, another bearing or group of bearings provides a downward force to oppose or "preload" the lift bearing. Alternatively, the lift bearing may be preloaded by utilizing spring-loaded means to couple the pad to the table slide. Counteracting side bearings are also provided to limit lateral table motion. By adjusting the pocket size, the number of pockets and pads and the air pressure, tables of most any size and weight can be adequately supported and guided. In addition, because air bearings are non-contacting, frictional forces are minimal. An example of a motion system that utilizes air bearings is shown in U.S. Pat. No. 4,234,175 issued to Sato et al. on Nov. 18, 1980.

One problem inherent with air bearings is the compressibility of the air medium. To produce a stiffer bearing, it is advantageous to minimize the bearing clearance (distance between the bearing pad and the guideway surface) as this reduces the volume of compressible air separating the components. However, decreasing the bearing clearance requires that the bearing pad, guideways, and table be machined and aligned to more exacting tolerances. Otherwise, the varying clearances between the moving components may result in unintended contact between the moving table and the guideway (i.e., "crashing"). Therefore, the air bearing system designer is often required to sacrifice bearing stiffness (increase bearing clearance) in order to maintain reasonable machining and assembly tolerances.

While conventional air bearings are more than adequate for many applications, problems remain. One problem in particular is attributable to the dissimilarity of the bearing material relative to the other system components. For example, the table and various other components are, in some systems, constructed of granite or diabase. These materials are preferred because they are thermally stable (i.e., they have a relatively low coefficient of thermal expansion or CTE) and they have excellent vibration damping characteristics. However, the bearing material itself is frequently metallic. As such, its CTE is much higher. The higher CTE results in the bearing pads expanding and contracting at a different rate than the granite. This can result in unintended restriction or expansion of the bearing clearance. If unaccounted for, this expansion can cause contact between the bearings and guideways and adversely affect the accuracy of the table position. Additionally, if localized temperature increases are experienced, the bearings may expand differentially, causing the table to shift and potentially crash into the guideways. Metallic bearing pads are furthermore subject to corrosion and thus may require periodic inspection and replacement.

Another problem inherent with conventional air bearings is the pocket itself. While the pocket provides a larger area over which air is distributed, it also increases the volume of compressible air supporting the table. Accordingly, the pocket limits the maximum bearing stiffness.

One method used to reduce or eliminate the dissimilar material problem discussed above is to eliminate the bearing pad altogether and incorporate the air bearing directly into the granite members. That is, passageways drilled in the granite couple the air source to bearing pockets formed in the granite itself. While the pocket diameter may be used to restrict the air flow, it is often of large diameter due to the drill size required to adequately form the pocket. Accordingly, the system may incorporate a plug having a small orifice thereon wherein the plug is inserted into each opening such that it is recessed from the bearing surface. Although such integral air bearings eliminate potential CTE mismatch and corrosion problems, the air column formed within the pocket still limits the maximum stiffness of the bearing.

Thus, there are unresolved issues with current motion system air bearings. What is needed is a bearing system for precision motion systems that permits minimal bearing clearance and improved bearing stiffness while preventing contact between the table slides and guideways. What is further needed is a bearing system that is capable of maintaining the desired bearing clearance regardless of temperature variations.

SUMMARY OF THE INVENTION

An insert for use in air bearing systems is provided, comprising a generally cylindrical body having a length and an outer diameter wherein the body has a first end and a second end. The first end has a blind hole formed therein where the hole has a depth and a hole diameter. The insert further comprises a bearing face formed on the second end and an orifice extending from the bearing face to the hole.

In another embodiment, an air bearing insert for use with a bearing member is disclosed wherein the bearing member has a first bearing surface and an opening for receiving the insert. The insert comprises a generally cylindrical body having a length and an outer diameter wherein the body has a first end and a second end. The first end has a blind hole formed therein where the hole has a depth and a hole diameter. A bearing face is formed on the second end and an orifice extends from the bearing face to the hole wherein the bearing face is generally coplanar with the first bearing surface when the insert is installed.

In another embodiment, a bearing member for use with a precision motion system is disclosed wherein the bearing member comprises: a first bearing surface adapted to engage a first guiding surface; a fluid passageway extending through the bearing member and terminating at the first bearing surface; and an air bearing insert located within the fluid passageway. The air bearing insert comprises: a generally cylindrical body having a length and an outer diameter wherein the body has a first end and a second end; the first end having a blind hole formed therein, the hole having a depth and a hole diameter; a bearing face formed on the second end; and an orifice extending from the bearing face to the hole. The insert is adapted to fit within the fluid passageway such that the bearing face is substantially coplanar with the first bearing surface.

In still yet another embodiment, a precision motion system is disclosed comprising: a moving table having one or more slide members coupled thereto, the slide members each defining one or more bearing surfaces; a base having one or more guideways coupled thereto wherein the base and guideways have one or more guiding surfaces adapted to guide the one or more bearing surfaces and permit movement of the table in a first direction; and an air bearing system adapted to permit movement of the table relative to the base. The air bearing system comprises at least one fluid passageway within the slide member and at least one air bearing insert located within the fluid passageway. The insert comprises: a generally cylindrical body having a length and an outer diameter wherein the body has a first end and a second end, the first end having a blind hole formed therein, where the hole has a depth and a hole diameter; a bearing face formed on the second end; and an orifice extending from the bearing face to the hole. The insert is adapted to fit within the fluid passageway such that the bearing face is substantially coplanar with the bearing surface.

Advantageously, the present invention provides an improved air bearing system for use with precision motion systems. In particular, the instant invention eliminates the separate bearing pad found on conventional systems and integrates the bearing directly into the primary components of the motion system itself. As such, CTE mismatch attributable to different materials is eliminated. Furthermore, the integral bearing system is not subject to the corrosion which is often a problem with conventional metallic pads. In addition, the bearing insert provided with the present invention places the restriction orifice immediately adjacent to the bearing surfaces. As such, the volume of air which forms the bearing interface is significantly reduced. This provides a dynamically stiffer bearing, which provides more accurate table positioning at lower supply pressures.

BRIEF DESCRIPTION OF THE DRAWINGS

The invention described herein will be further characterized with reference to the drawings, wherein.

DETAILED DESCRIPTION OF THE EMBODIMENTS

In the following detailed description of the embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
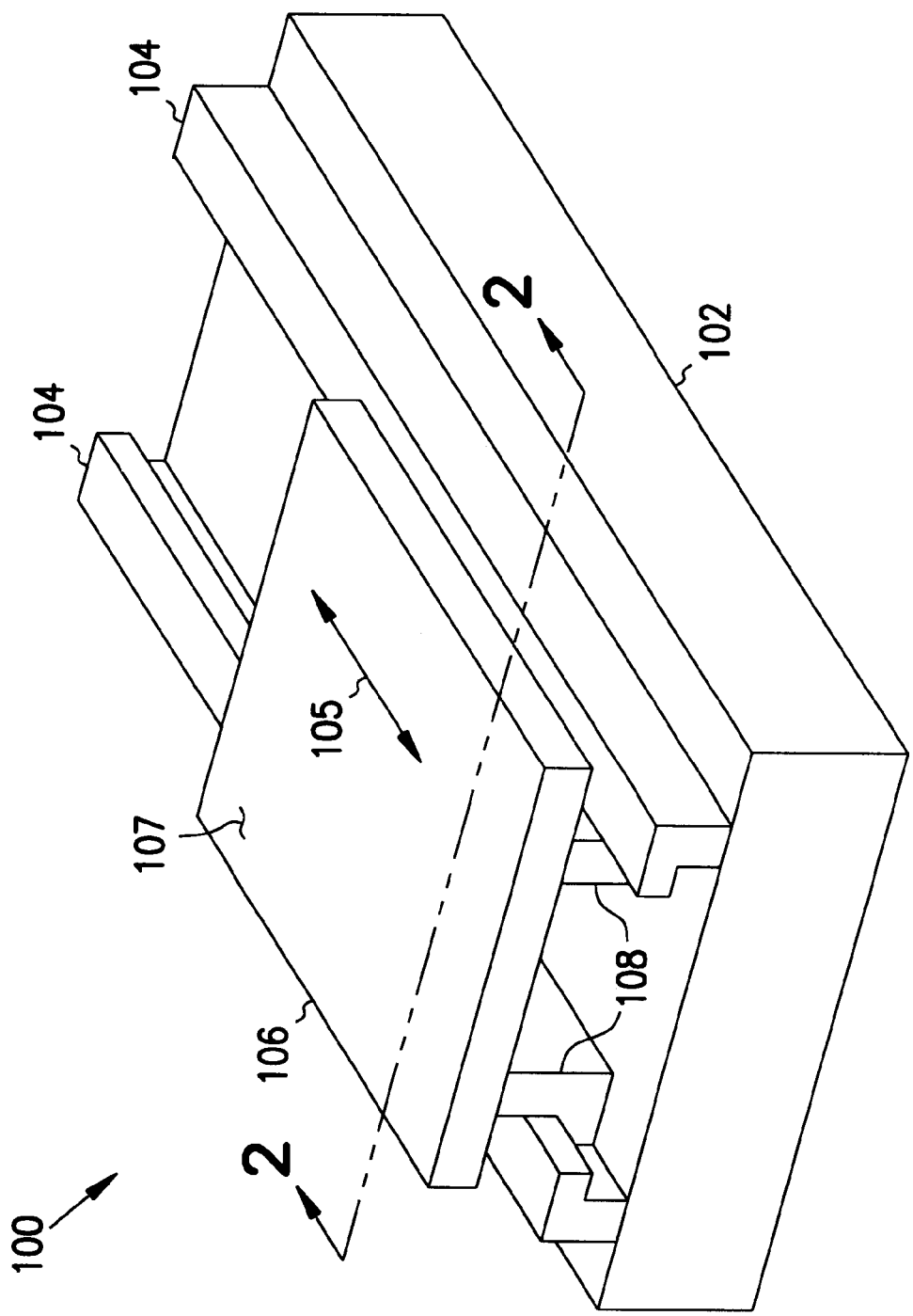
FIG. 1 is a perspective view of a motion system in accordance with one embodiment of the invention.

The air bearing of the instant invention will be described with respect to a massive precision motion system. Precision motion systems are used in various applications including CMM, large machine tools, and the like. An exemplary embodiment of a generic motion system 100 is shown in FIG. 1. The system includes a base plate 102 which supports one or more guideways 104. The guideways receive a table 106 having bearing members or slides 108. An air bearing system (described below) coupled to the slides 108 allows the table 106 to move relatively friction-free along the guideways 104 in a longitudinal direction 105. The table includes a precision table surface 107 which serves as the tooling or working surface. While table motion may be controlled manually, it is, in one embodiment, servo-controlled through the use of servo motors, servo hydraulics, or the like. By precisely controlling the tolerances and relative alignment of the table, slides, guideways and base plate, extremely accurate and repeatable positioning of the table may be achieved along its entire range of travel.

While the components of the motion system can be made from numerous materials, the base plate 102, table 106, slides 108, and guideways 104 are constructed from granite or diabase in one embodiment. Although different from a geological perspective, for purposes of this discussion the term "granite" will be used to refer generically to diabase, granite, or other similar materials suitable for producing extremely flat surfaces. Granite is advantageous over other metallic and non-metallic materials for several reasons. In particular, it is thermally stable and has a very low coefficient of thermal expansion (CTE). Thus, when subjected to thermal stresses, it experiences little dimensional change. In addition, granite possesses superior vibration damping characteristics. While beneficial in these respects, granite is also very dense and therefore heavy. As such, conventional mechanical bearings are unable to adequately support the table without contributing excessive rolling friction. Accordingly, the present invention uses air film bearings or "air bearings."

Figure 2:
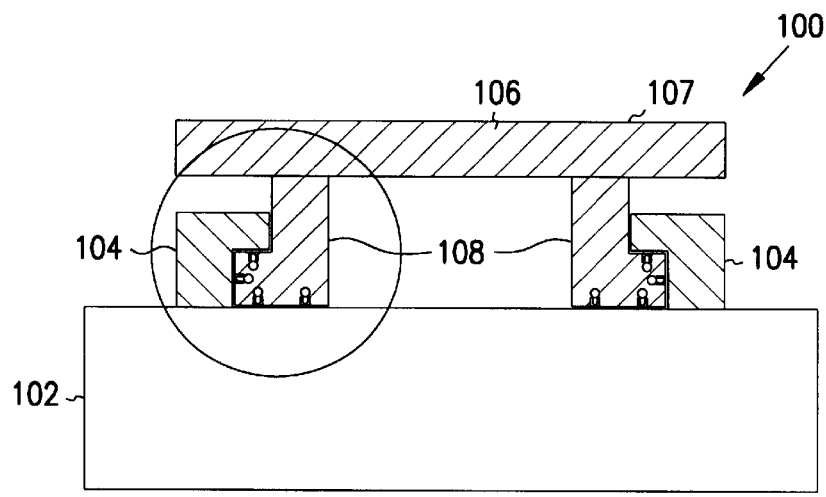
FIG. 2 is an partial section view of the motion system of FIG. 1 taken along line 2—2 of FIG. 1.
Figure 3:
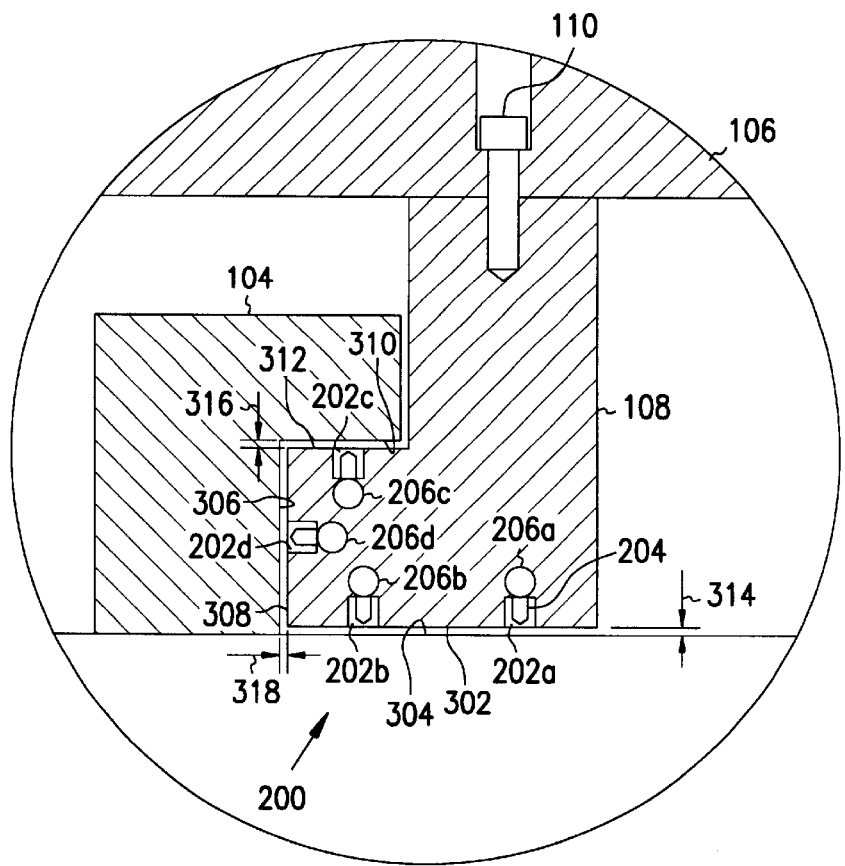
FIG. 3 is an enlarged partial view of a portion of the motion system of FIG. 2.

Referring to FIGS. 2–5, an air bearing system 200 according to one embodiment of the instant invention will be described. FIG. 2 shows the motion system 100 from an end section view. FIG. 3 is an enlarged view of a portion of FIG. 2 showing the slide 108 and the guideway 104. While only one slide/guideway is shown, the other is substantially a mirror image unless otherwise noted herein. The air bearing system 200 comprises a plurality of bearing inserts 202. The inserts are located in openings 204 in the slides 108 at various locations as further discussed below. Fluidly coupled to each opening 204 is a passageway 206 extending longitudinally along the slide 108. The passageways 206 are bored through the actual slides 108 so that a second opening (not shown) is provided at the end of each slide for each passageway. The second opening is adapted to couple to a pressurized fluid source such as compressed air. The term "bearing" is used herein to generally indicate the opening 204 and the insert therein.

Referring particularly to FIG. 3, the slide 108 is rigidly coupled to the table 106 by a plurality of fasteners 110. While the fastener 110 is shown as bolted through the table to the slide, alternative embodiments may bolt oppositely (i.e., the fastener 110 may extend through the slide 108 and engage threads in the table 106). The guideways 104 are similarly attached to the base 102. Each pair of slides 108 is precisely machined, lapped and aligned such that, when assembled to the table 106, the table surface 107 is substantially parallel to a first bearing or slide surface 302 of the slide 108 which is, in turn, substantially parallel to a first guiding surface 304 of the base 102. Similarly, the guideway 104 is precisely machined and aligned such that a second guiding surface 306 is substantially parallel to a second bearing or slide surface 308 of the slide 108. The guideway 104 includes a third guiding surface 310 which is machined and aligned to be substantially parallel to a third bearing or slide surface 312. Accordingly, the table, slides, guideways, and base are machined and lapped to precise tolerances and aligned to permit table motion in substantially only one direction.

Referring still to FIG. 3, to support the table during motion, the air bearing system 200 provides pressurized air through the passageways 206 and ultimately to the bearing inserts 202. The air passes through the inserts and impinges upon the respective guiding surfaces 304, 306, and 310. To support the weight of the table, pressurized air is supplied via passageways 206a and 206b to the "lift" inserts 202a and 202b respectively. It is noted that while only two lifting bearing inserts 202a, 202b are shown in FIG. 3, there are actually several inserts placed at intervals along the length of the guides 108. For example, one embodiment utilizes a bearing insert 202a, 202b every two to three inches along the longitudinal length of the slide 108. In another embodiment, more than two rows of bearing inserts 202 are placed across the surface 302. However, the actual quantity and placement of the bearings depends on several factors including table weight, air pressure, bearing insert design, and desired air film thickness, among others.

When the pressure of the air in the passageway reaches a particular level, the air escaping to the atmosphere forms a thin air film between the surfaces 302 and 304. This air film has a thickness 314 which is controlled by, among other factors, the magnitude of the pressurized air. While the stiffness of an air bearing can be maximized by minimizing the air film thickness 314 or "flying height," even slight non-parallelism and surface imperfections in the surfaces 302 and 304 may require an increase in flying height to prevent unintended contact between the components. Accordingly, the flying height is set to accommodate the worst-case tolerance.

To further increase the stiffness of the air bearings, the insert 202c is provided. The insert 202c is fed by the passageway 206c and operates in a manner substantially identical to the inserts 202a and 202b. The purpose of the insert 202c is to preload the air bearings 202a, 202b. That is, the insert 202c provides a constant force opposite the lifting force provided by the bearings 202a and 202b. This constant preload provides additional stiffness to the air bearing system. Like the bearing inserts 202a, 202b, the bearing insert 202c develops an air film having a thickness 316 between the surfaces 310 and 312.

The air bearing system 200 also includes side bearings to prevent lateral motion of the table 106. The side bearing includes a bearing insert 202d and passageway 206d and operates in a manner substantially identical to the bearings 202a, 202b, and 202c. By providing an identical side bearing on the opposite guide, the side bearings are also preloaded relative to one another. Like the other bearings discussed above, the side bearing develops an air film of thickness 318 between the surfaces 306 and 308.

Thus, the air bearing system provides support for longitudinal motion of the table while restricting lateral and vertical motion. Each bearing within the system includes a counteracting bearing to provide a constant preload, improving the relative stiffness of the bearing system in all directions.

Figure 4:
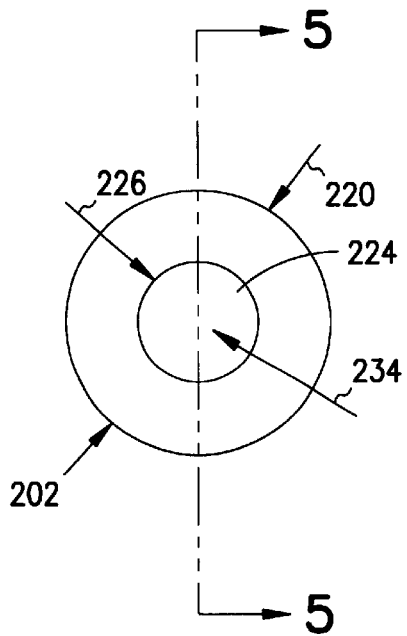
FIG. 4 is an end elevation view of an air bearing in accordance with one embodiment of the invention.
Figure 5:
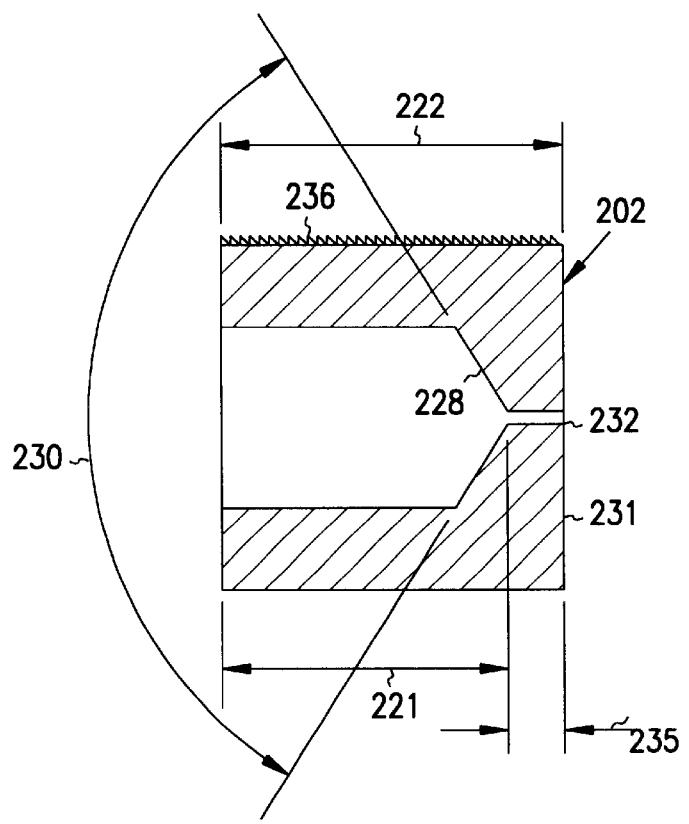
FIG. 5 is a section view of the air bearing of FIG. 4 taken along line 5—5 of FIG. 4.

Having described the overall construction of the system 100 in some detail, attention will now be focused on the bearing insert 202 itself. Referring specifically to FIGS. 4–5, the bearing insert 202 is illustrated in accordance with one embodiment of the invention. The insert has a cylindrical body having an outer diameter 220 and a length 222. The bearing insert, at a first end, has a blind hole 224 of hole diameter 226 and depth 221 wherein the blind hole, in one embodiment, terminates at a conical-shaped bottom 228 of angle 230. Extending from a second or bearing face end 231 to the blind hole 224 is an orifice 232 of diameter 234 and length 222. In one embodiment, the bearing insert is machined from brass. However, inserts of other materials are also possible without departing from the scope of the invention.

Referring again to FIG. 3, when the bearing insert 202 is installed, it is positioned such that the face end 231 is substantially flush with the respective guide surfaces 302, 308, and 312 (e.g., inserts 202a, 202b are flush with surface 302, insert 202c is flush with surface 312, etc). This positions the orifice 232 immediately proximal to the respective guiding surfaces 304, 306, and 310. Thus, unlike known air bearings, there is no "pocket" or air column between the orifice restriction and the bearing surface. Elimination of the pocket reduces the volume of compressible air defining the air film which effectively increases bearing stiffness. Furthermore, by adjusting the orifice diameter 234 and length 222, the pressure drop across the orifice can be accurately controlled.

The insert 202 is secured in the opening 204 by an interference fit. To ensure the insert is adequate affixed, the insert body may include a knurled texture 236 that deforms as the insert is pressed into the granite slide 108. In another embodiment, the insert may be first coated with an adhesive. In still yet another embodiment, the insert may be installed by a shrink-fit.

While the exact geometry of the insert 202 is not perceived to be critical, one embodiment provides an outer diameter 220 of approximately 0.50 inches, a length 222 of approximately 0.5 inches, and a hole diameter 226 of approximately 0.25 inches. This yields an aspect ratio of outer diameter to body length of one. The orifice 232 has a diameter 234 of approximately 0.008 inches. This yields an aspect ratio of hole diameter 226 to the orifice of approximately thirty. To reduce losses across the restriction orifice 232, the orifice length 235 is, in one embodiment, approximately 0.080 inches. To maintain smooth flow through the orifice, the angle 230 is approximately 118 degrees. The reader is reminded that the embodiment described is exemplary only and inserts of other sizes and shapes may certainly be used without departing from the scope of the invention.

When making the motion system of the instant invention, conventional machining and lapping operations are used to make the granite components (table, slides, guideways, and base). In one embodiment, linear dimensional tolerances of the slides 108 and guideways 104 vary from 3–10 microns while geometric tolerances (squareness, flatness, parallelism) are held to a maximum of 2 microns. The slides 108 are precisely aligned with and fastened to the table 106 while the guideways 108 are likewise secured to the base 102. To ensure accurate assembly, conventional alignment methods utilizing such equipment as laser aligners, autocollimators, and electronic levels are used.

The granite components (base 102, guideways 104, table 106, and slides 108) are lapped to provide smooth, flat surfaces. Prior to lapping the slides 108, the bearing inserts 202 are first installed such that the face 231 protrudes slightly beyond the bearing surfaces 302, 308, and 312. The lapping process then ensures that the insert face 231 is made planar with the respective slide surfaces. To prevent plugging of the orifice 232 during the lapping process, orifice drilling may be delayed until completion of lapping. Alternatively, if the orifice does plug, it may be re-drilled after lapping.

Figure 6:
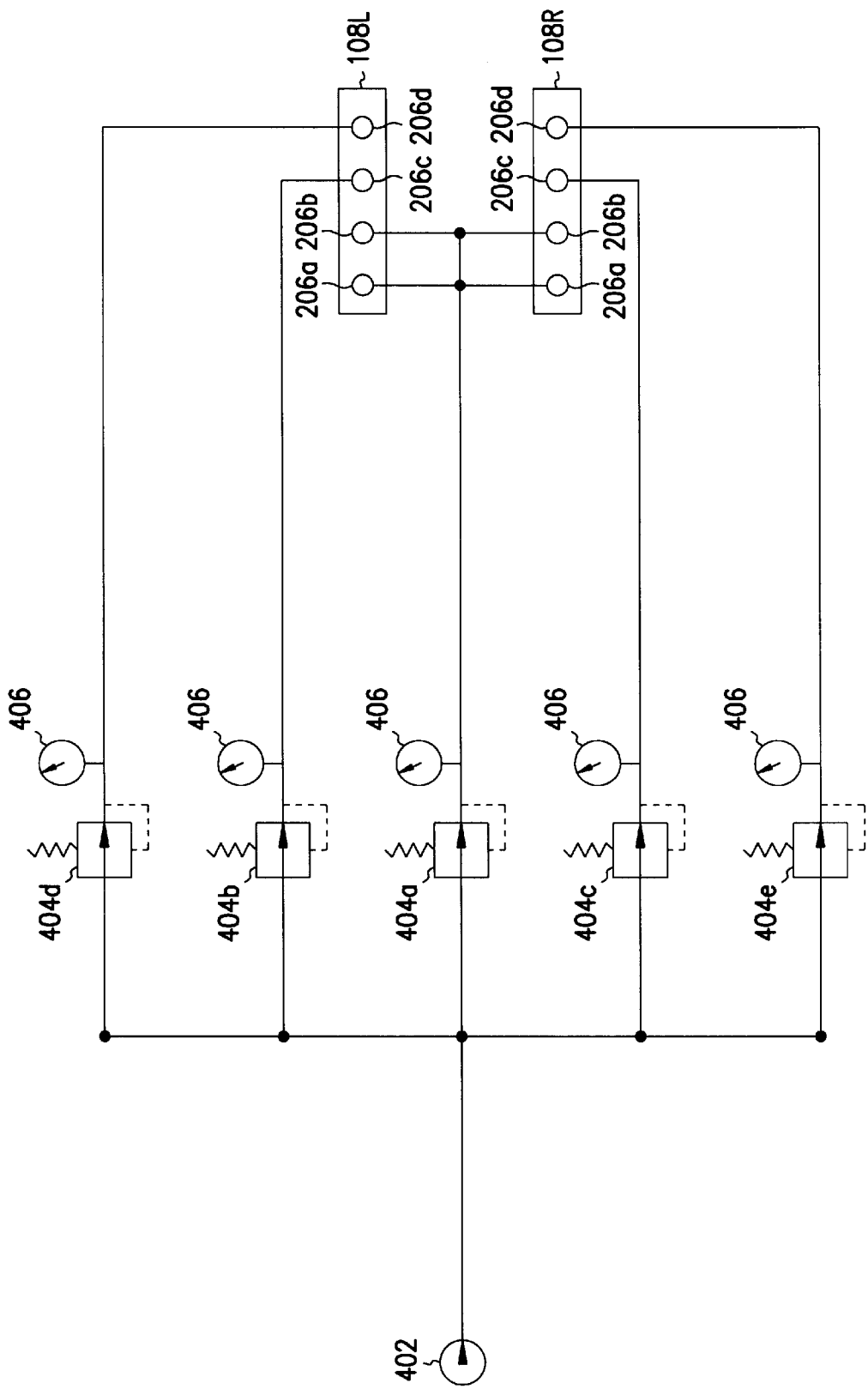
FIG. 6 is a diagrammatic view of a pressure system for use with the bearing system of FIG. 3.

During operation, pressurized fluid is supplied to the air bearing system 200. Referring to FIG. 6, an air control system 400 capable of regulating air flow to the air bearing system will be described in accordance with one embodiment of the invention. A conventional air compressor 402 supplies the pressurized air to various circuits each feeding different bearings 202 via the respective passageways 206. To more accurately control air film thickness, a regulator 404 may be utilized for each circuit. An air gage 406 may also be provided to indicate the actual pressure setting of the regulator 404. In one embodiment, a first regulator 404a provides pressurized air to both the passageways 206a and 206b on both the left slide 108L and the right slide 108R. This provides even lift to the table 106. The passageways 206c of each slide 108 are respectively coupled to a second and third regulator 404b and 404c while the passageways 206d of each slide 108 are respectively coupled to a fourth and fifth regulator 404d and 404e. Accordingly, the first regulator 404a controls lift pressure evenly on both slides while the second and third regulators 404b and 404c control preload pressure independently on each slide. Finally, fourth and fifth regulators 404d and 404e control side bearing pressure independently for each slide 108. Independent adjustment of each regulator 404 allows the system to be precisely and accurately adjusted. While shown with five regulators, other embodiments utilizing other numbers of regulators and other air circuit configurations are also possible. For example, one regulator may feed all the passageways 206 such that each passageway is at an identical air pressure.

The air bearing system of the instant invention provides improved table positioning accuracy over conventional metal or other "integrated" granite bearings. This improved accuracy is furthermore accomplished at relatively low air pressure. In one embodiment, a table 48 inches wide and 96 inches long having a longitudinal travel of 96 inches maintains roll (rotation about the longitudinal axis), pitch (rotation about the transverse axis) and yaw (rotation about the vertical axis) within three arc-seconds. This is accomplished at a bearing supply pressure of 40–45 psi.

Figure 7:
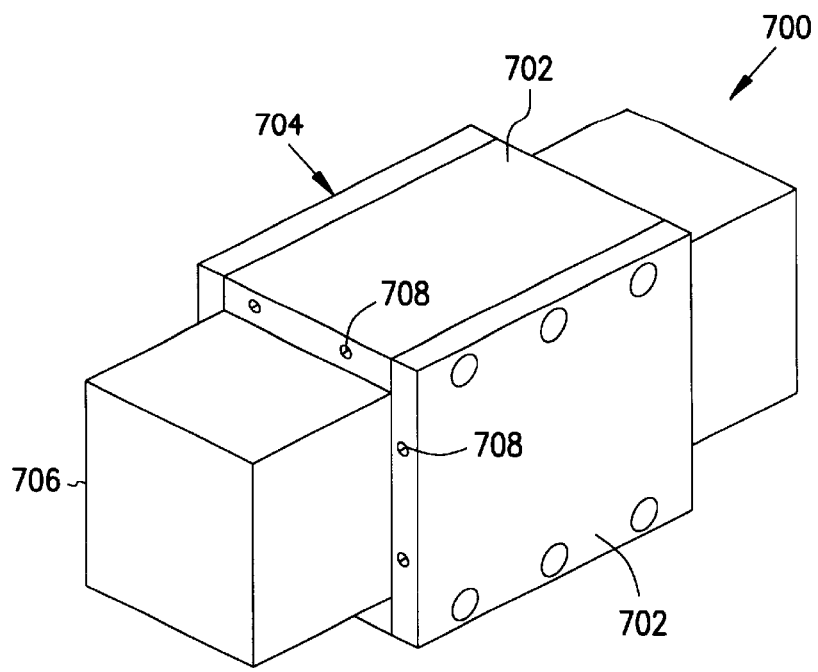
FIG. 7 is a perspective view of a motion system constructed in accordance with another embodiment of the invention.
Figure 8:
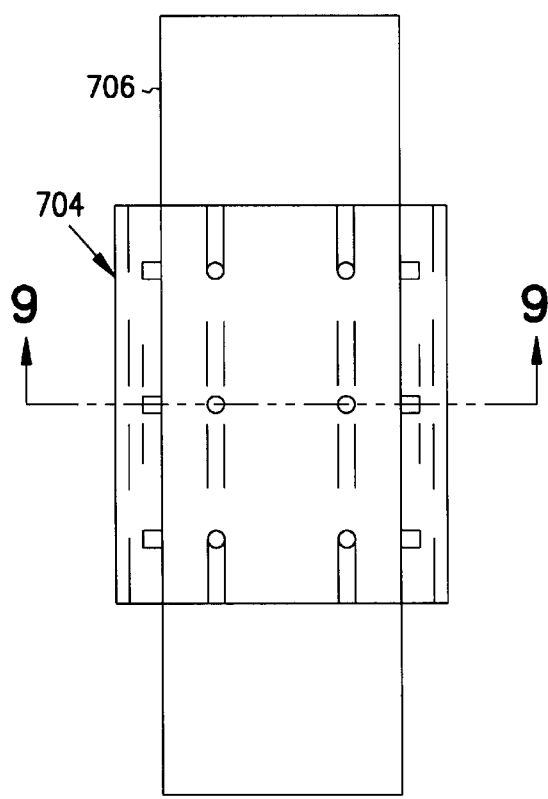
FIG. 8 is a top plan view of the motion system of FIG. 7.
Figure 9:
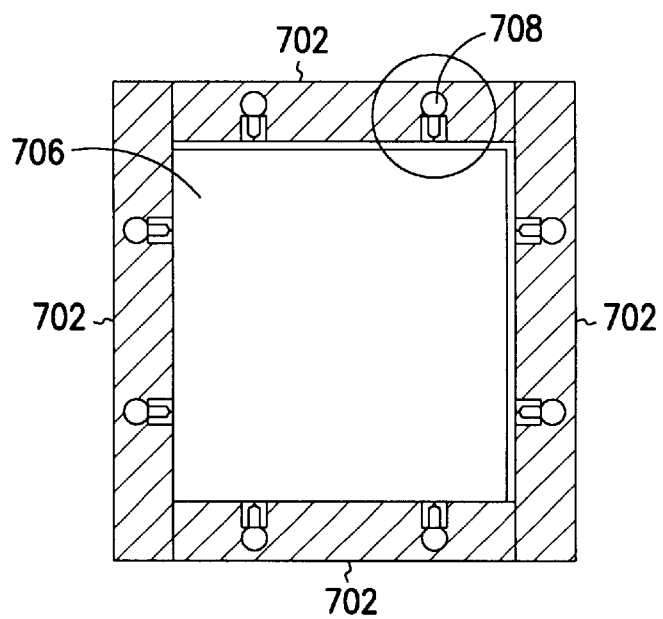
FIG. 9 is a sectional view of the motion system of FIG. 7 taken along line 9—9 of FIG. 8.
Figure 10:
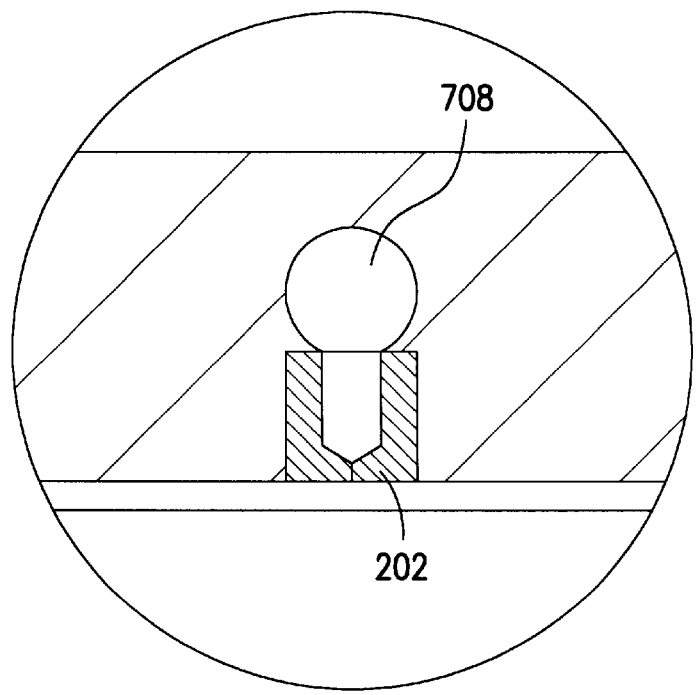
FIG. 10 is an enlarged partial view of a portion of the motion system of FIG. 9.
Figure 11:
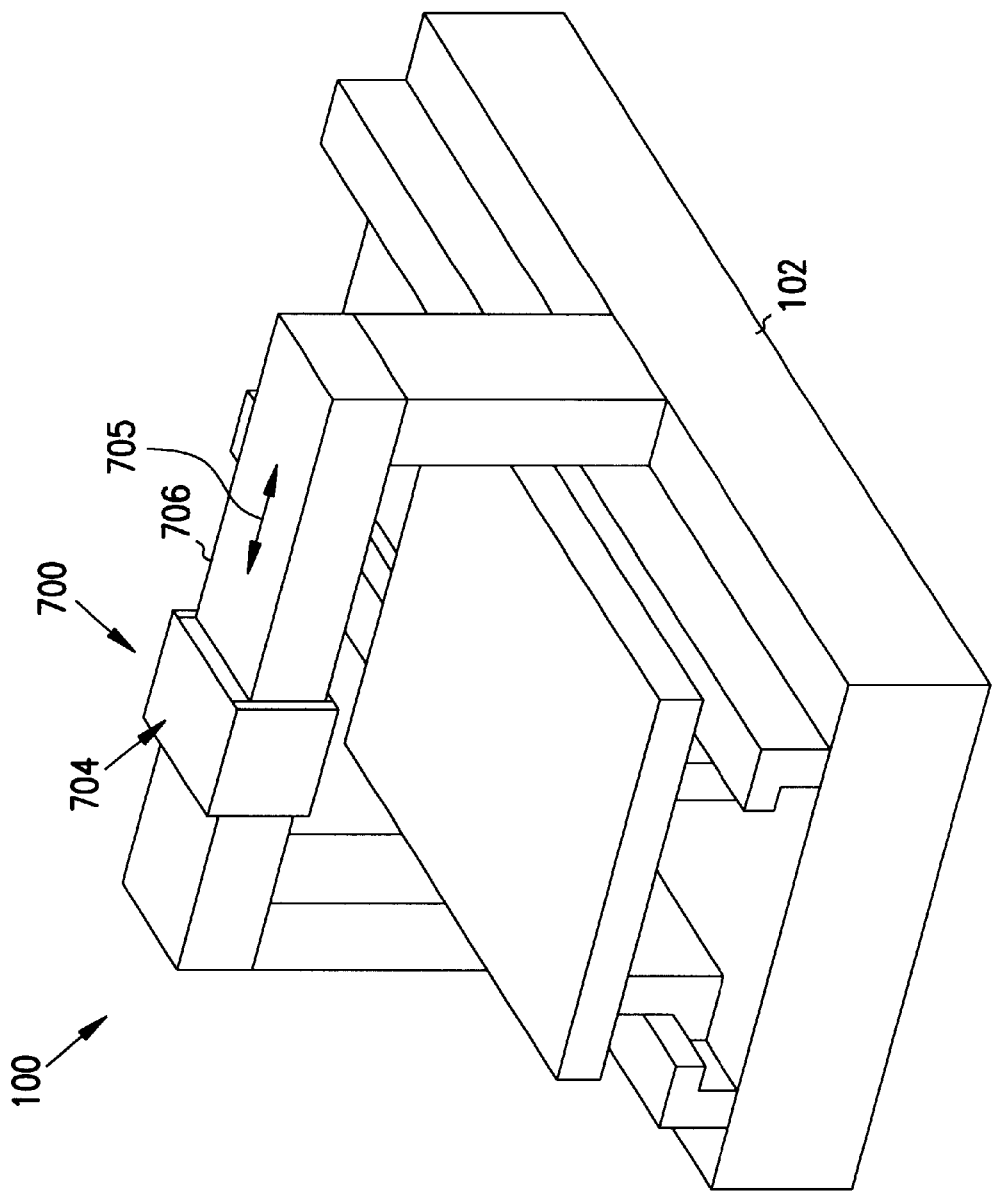
FIG. 11 is a perspective view of a motion system constructed in accordance with yet another embodiment of the invention.

While the invention has so far been described with reference to a sliding horizontal table, other embodiments are also possible. For example, a horizontal slide assembly 700 as shown in FIG. 7 may also incorporate the bearing system as described herein. The slide assembly 700 may be used either independently or in conjunction with a positioning system such as that shown in FIG. 1. For an example of the latter, attention is directed to FIG. 11 where the slide assembly 700 is mounted to the base 102 to permit sliding, horizontal movement lateral to the table motion as indicated by directional arrows 705. Thus, accurate positioning is achieved along two axes.

Referring now to FIGS. 7–10, the slide assembly 700 comprises a plurality of slide plates 702 which are fastened together to form a box guide 704. Like the components of the motion system 100, the plates are precisely machined/lapped so that opposing plates remain substantially parallel. In sliding engagement with the box guide 704 is a guide member 706. Both the plates 702 and the guide member 706 may be made of granite or another suitable material.

Passing longitudinally through each plate 702 is one or more passageways 708. Like the passageways 206, the passageways 708 provide fluid coupling between a pressurized air source (not shown) and the bearing inserts 202 (see FIG. 10). The inserts 202 are installed in a manner similar to that already described herein. Accordingly, when adequately pressurized, an air film forms between the box guide 704 and the guide member 706, allowing the two components to move relative to each other unimpeded by friction.

Advantageously, the present invention provides an improved air bearing system for use with precision motion systems. In particular, the instant invention eliminates the separate bearing pad found on conventional systems and integrates the bearing directly into the primary components of the motion system itself. As such, CTE mismatch attributable to different materials is eliminated. Furthermore, the integral bearing system is not subject to the corrosion which is often a problem with conventional metallic pads. In addition, the bearing insert provided with the present invention places the restriction orifice immediately adjacent to the bearing surfaces. As such, the volume of air which forms the bearing interface is significantly reduced. This provides a dynamically stiffer bearing, which provides more accurate table positioning at lower supply pressures.

Preferred embodiments of the present invention are described above. Those skilled in the art will recognize that many embodiments are possible within the scope of the invention. Variations, modifications, and combinations of the various parts and assemblies can certainly be made and still fall within the scope of the invention. Thus, the invention is limited only by the following claims, and equivalents thereto.

What is claimed is:

1. An insert for use in air bearing systems, the insert comprising:
   a generally cylindrical body having a length and an outer diameter, wherein the body has a first end and a second end, the first end having a blind hole therein, said blind hole having a depth and a hole diameter;
   a bearing face formed on the second end;
   an orifice extending from the bearing face to the hole; and
   wherein the bearing face is substantially flush with a bearing surface and the bearing face is immediately proximal to the bearing surface.

2. The insert of claim 1 wherein the insert is made of brass.

3. The insert of claim 1 wherein the hole has a generally conical-shaped bottom.

4. The insert of claim 1 wherein the outer diameter of the body is knurled.

5. The insert of claim 1 wherein the aspect ratio of the outer diameter to the body length is approximately one.

6. The insert of claim 1 wherein the aspect ratio of the hole diameter to the orifice is approximately 30.

7. An air bearing insert for use with a bearing member wherein the bearing member has a first bearing surface and an opening for receiving the insert, the insert comprising;
   a generally cylindrical body having a length and an outer diameter, wherein the body has a first end and a second end, the first end having a blind hole therein, said blind hole having a depth and a hole diameter;
   a bearing face formed on the second end; and
   an orifice extending from the bearing face to the hole,
   wherein the bearing face is generally coplanar with a first bearing surface when the insert is installed; and
   wherein the bearing face is substantially flush with the first bearing surface and the bearing face is immediately proximal to the bearing surface when the insert is installed.

8. The assembly of claim 7 wherein the insert is made of brass.

9. A bearing member for use with a precision motion system, wherein the bearing member comprises:
   a first bearing surface adapted to engage a first guiding surface;
   a fluid passageway extending through the bearing member and terminating at the first bearing surface;
   an air bearing insert located within the fluid passageway, comprising:
     a generally cylindrical body having a length and an outer diameter, wherein the body has a first end and a second end, the first end having a blind hole therein, said blind hole having a depth and a hole diameter;
     a bearing face formed on the second end; and
     an orifice extending from the bearing face to the hole,
   wherein the insert is adapted to fit within the fluid passageway such that the bearing face is substantially coplanar with the first bearing surface; and
   wherein the bearing face is substantially flush with the first bearing surface and the bearing face is immediately proximal to the first bearing surface.

10. The bearing member of claim 9 wherein the passageway receives the insert in an interference fit.

11. The bearing member of claim 9 wherein the bearing member material is granite.

12. The bearing member of claim 9 wherein the bearing member material is diabase.

13. The bearing member of claim 9 further comprising a second bearing surface adapted to engage a second guiding surface.

14. The bearing member of claim 13 further comprising a third bearing surface adapted to engage a third guiding surface.

15. A precision motion system comprising:
   a moving table having one or more slide members coupled thereto, the slide members each defining one or more bearing surfaces;
   a base having one or more guideways coupled thereto wherein the base and guideways have one or more guiding surfaces adapted to guide the one or more bearing surfaces and permit movement of the table in a first direction; and
   an air bearing system adapted to permit movement of the table relative to the base, the air bearing system comprising:
     at least one fluid passageway within the slide member; and
     at least one air bearing insert located within the fluid passageway, the insert comprising:
       a generally cylindrical body having a length and an outer diameter, wherein the body has a first end and a second end, the first end having a blind hole therein, said blind hole having a depth and a hole diameter;
       a bearing face formed on the second end; and
       an orifice extending from the bearing face to the hole,
     wherein the insert is adapted to fit within the fluid passageway such that the bearing face is substantially coplanar with the bearing surface; and
     wherein the bearing face is substantially flush with the bearing surface and immediately proximal to the bearing surface.

16. The precision motion system of claim 15 further comprising an air control system for metering pressurized air flow to the passageway(s).

17. The precision motion system of claim 15 further comprising a slide assembly coupled to the base, wherein the slide assembly is adapted to move independently in a second direction substantially perpendicular to the first direction.

18. The precision motion system of claim 17 wherein the slide assembly comprises a box guide surrounding a guide member, the box guide including a plurality of air bearings adapted to permit relative motion between the box guide and the guide member.

* * * * *